UNITED STATES PATENT OFFICE.

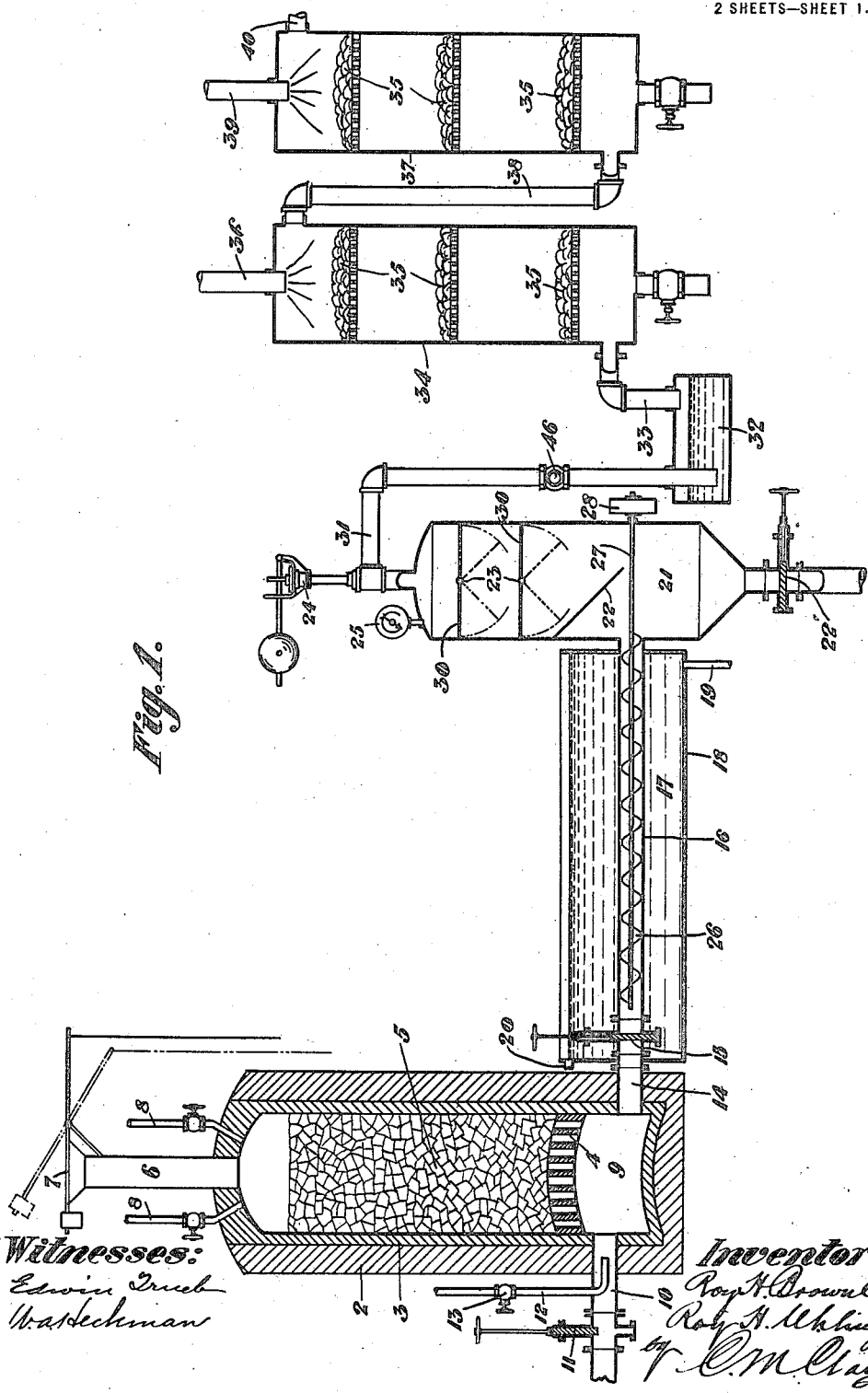
R. H. BROWNLEE & R. H. UHLINGER.
PROCESS FOR THE MANUFACTURE OF HYDROGEN AND CARBON BLACK.
APPLICATION FILED MAR. 12, 1915.
1,168,931. Patented Jan. 18, 1916.

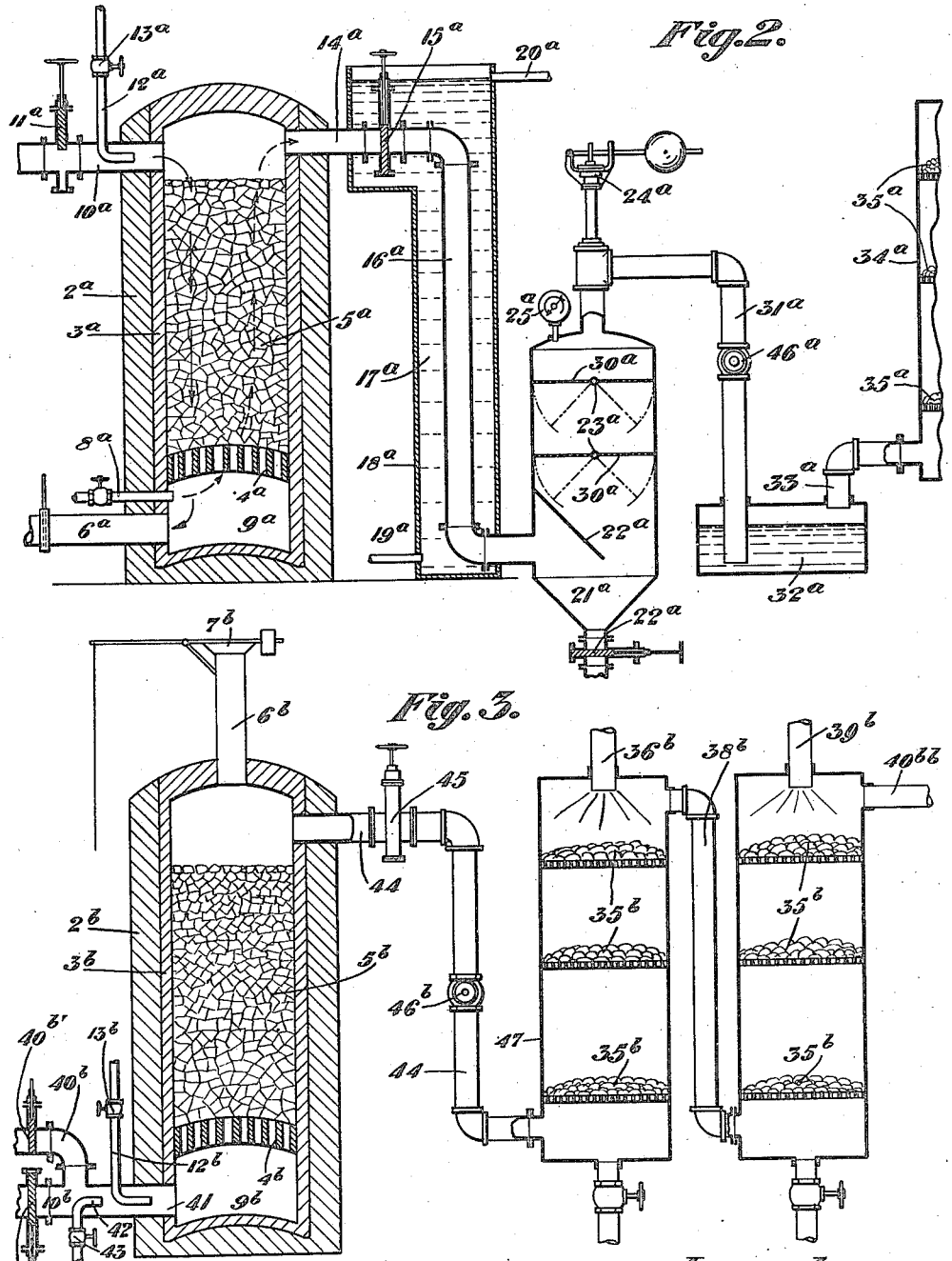

ROY H. BROWNLEE AND ROY H. UHLINGER, OF PITTSBURGH, PENNSYLVANIA, ASSIGNORS TO AMERICAN NITRO-PRODUCTS COMPANY, OF PITTSBURGH, PENNSYLVANIA, A CORPORATION OF DELAWARE.

PROCESS FOR THE MANUFACTURE OF HYDROGEN AND CARBON-BLACK.

1,168,931.     Specification of Letters Patent.   Patented Jan. 18, 1916.

Application filed March 12, 1915. Serial No. 14,011

*To all whom it may concern:*

Be it known that we, ROY H. BROWNLEE and ROY H. UHLINGER, citizens of the United States, residing at Pittsburgh, in the county of Allegheny and State of Pennsylvania, have invented certain new and useful Improvements in Processes for the Manufacture of Hydrogen and Carbon-Black, of which the following is a specification.

Our invention consists of an improved method or process of making hydrogen and carbon black in large quantities at low cost, and without the use of complicated or expensive equipment.

Generally stated, the process consists in highly heating a mass of highly refractory material, in the absence of easily reducible metallic oxids, within a suitable well-insulated containing chamber, and then passing through such chamber and hot refractory material a suitable hydrocarbon, in the absence of air or other gases, and at a pressure materially above atmospheric pressure. By this means the hydrocarbon is decomposed by coming into intimate contact with the highly heated refractory material, and is thereby decomposed, forming hydrogen and carbon. By carrying out the process under pressure, a much greater efficiency is secured, as for instance, at a pressure of two atmospheres, a furnace of given dimensions will hold double the amount of gas as at one atmosphere, and practically twice the amount of gas per hour can be decomposed.

The present application relates to similar subject matter as that of our prior application filed January 21, 1914, Serial No. 813457. The apparatus shown and described in said application may be employed with good results, or the modified construction illustrated herewith.

Referring to the drawings,—Figure 1 shows in sectional elevation an apparatus adapted to the process. Figs. 2 and 3 are similar views, showing modified arrangements of the elements.

Referring to Fig. 1, providing for the operation, it is carried out as follows: A vertical gas-tight furnace or chamber 2 is constructed to withstand the pressure of several atmospheres, preferably provided with highly refractive linings 3 of suitable fire brick, and near the bottom is a supporting checkerwork 4 of similar material.

A filling of irregular pieces of refractory material 5 is contained within the body of the furnace, above the supporting checkerwork, or the entire inner part of the furnace may be built up of checkerwork of suitable refractory brick.

At the top of the furnace is a stack 6 provided with a suitable damper valve 7 for closing the stack and furnace gas-tight. Inlet pipes 8 for supplying hydrocarbon, as natural gas, are introduced through the upper portion of the furnace. A damper controlled air conduit 10 having a damper or valve 11 and a gas pipe 12 having a controlling valve 13, are introduced to chamber 9 below the checkerwork or refractory material 5 for heating the furnace and its contents.

Leading outwardly from the base of the furnace 2, at any suitable location, is a conduit 14 provided with an opening and closing valve or damper 15 for controlling the circulation, beyond which the conduit is connected with the tubular conveyer 16. Said conveyer extends through a cooling bath 17 of water within a surrounding inclosing tank or casing 18, provided with a supply connection 19 and an overflow 20. The other end of the conveying conduit 16 leads to a receiving hopper 21, provided with an outlet controlling valve 22' at its lower portion for removal of carbon. At the upper end of this hopper is a screen box portion, between which and the lower portion of the hopper preferably extends a sloping partition or shield 22.

The conduit 16 is provided with a rotatable screw conveyer 26, actuated by shaft 27 driven by any suitable gearing 28, as a pulley or sprocket wheel, whereby to propel the precipitated carbon through the conduit. The upper screen box portion of the hopper is provided with fine screens 30 of cloth or other filtering medium of a suitable nature to filter out the carbon remaining in the hydrogen. These screens are preferably mounted adjustably within the casing, as by hinged mountings 23 adapted to be raised to horizontal operative position, as shown, or to be lowered, as indicated in dotted lines, whereby, by a suitable lever mechanism on the outside of the casing, any collected carbon may be dropped into the hopper below. The outlet at the upper portion of the casing is provided with a suitable safety valve 24 and a pressure indicating gage 25.

Beyond the screens is a conduit 31 leading to a water seal vessel 32, in which the terminal of the conduit is submerged and conduit 33 leads from the upper portion of water seal vessel 32 to a scrubber 34 of any suitable construction, provided with porous material 35 such as coke and a water spray 36, whereby, by means of water, the gases are cooled and washed. An additional scrubber 37 may also be provided, connected with the primary scrubber 34 by a circulation pipe 38, into which a spray pipe 39 of lime water or other alkaline material may be introduced, by which impurities in the hydrogen are removed, such as traces of sulfur compounds in the gas or other hydrocarbon used, the hydrogen passing off by outlet pipe 40 to any suitable collecting or storage tank.

At any suitable point beyond the carbon separator or screen box is the automatically regulated pressure relief valve 46 for holding the desired pressure in the furnace and carbon separator. Such valve is preferably situated between the carbon separator and the water seal 32, but may also be inserted in the line beyond the scrubbers, if preferred, for the same purpose. It will also be understood that the pressure in the furnace 2 may be regulated by valve 15, or lower pressures may be regulated by the depth of the end of the conduit 31 in the water seal 22.

In case nearly chemically pure hydrogen is required and the available gas or other hyrocarbon, used in the process, contains a considerable amount of nitrogen or other impurities, such as carbon monoxid or carbon dioxid, it will be necessary to liquefy and rectify the gases from the furnace to remove these impurities, or any other suitable method of purification may be resorted to, as required.

Fig. 2 shows a modified arrangement of the furnace $2^a$ whereby the heat of the refractory material leads downwardly from the top to a suitable outlet $6^a$, gas being furnished by pipe $12^a$ having a valve $13^a$ and air by pipe $10^a$ having a valve $11^a$. The gas to be decomposed in such case enters through the base of the furnace by pipe $8^a$, passing upwardly through the checkerwork $5^a$ and outwardly at the top through conduit $14^a$. Said conduit is likewise provided with a controlling valve $15^a$ and a conduit $16^a$ extends vertically down within and through a body of water $17^a$ in casing $18^a$ provided with a supply connection $19^a$ and an overflow $20^a$. The lower end of the conduit opens into a hopper $21^a$ of the same construction as above described, adapted to collect the carbon, the hydrogen passing off in the same manner and through the same apparatus, similarly indicated by numerals having an exponent "a." This arrangement and the operation carried out with the apparatus of Fig. 2 is desirable when hydrogen is the product required, as this procedure of passing the hydrocarbon upwardly under pressure decreases the amount of carbon which is carried over into the conveying conduit, and leaves more in the checkerwork where it is burned during the succeeding heating periods.

Fig. 3 shows a suitable apparatus for carrying out the method with a further or supplemental purification of the hydrogen when it contains carbon monoxid, as is ordinarily the case. In such arrangement a furnace $2^b$ similar in construction to the furnaces above described having the refractory material or metallic oxids $5^b$ is adapted to receive the hydrogen coming over by pipe $40^b$ having a suitable controlling valve $40^{b\prime}$, from the last scrubber 37, or directly from pipe 33. Said conduit connects with a conduit 41 opening into the chamber $9^b$ below supporting checkerwork $4^b$, and into such conduit 41 is introduced a steam pipe 42 having a controlling valve 43 for the addition of steam. Incidentally, a gas pipe $12^b$ having a controlling valve $13^b$, is introduced into conduit 41, and said conduit is provided with an extension $10^b$ having a valve $11^b$ for inlet of air, whereby to provide for the introduction of fuel and air for the preheating of the refractory material, the products of combustion passing off by stack $6^b$ having the damper $7^b$. By this means, upon closing circulation of the gases through valve $40^{b\prime}$ and steam through pipe 42, the checkerwork $5^b$ may be re-heated at the same time as the checkerwork 5 in the primary furnace 2 or $2^a$ is being heated. From such supplemental furnace $2^b$ the gases after passing through the refractory material are led off by conduit 44 having a controlling valve 45, and if desired, a check valve $46^b$, whereby the hydrogen and carbon dioxid are introduced into the base of a cooling tower 47. Such tower is provided with porous material $35^b$ and a water spray pipe $36^b$, a conduit $38^b$ leading the gases to one or more additional similar towers, similarly provided with porous material and spray $39^b$ for introducing lime water or other alkaline material for the removal of the carbon dioxid produced in the furnace. The gas passing from the last scrubber by conduit $40^{bb}$ will be very pure hydrogen if gas or oil free from nitrogen is originally used.

The several scrubbers are provided at the bottom with discharge pipes for carrying off the waste water and impurities.

It will be understood that it is essential to the operation that no oxidizable metals or easily reducible metallic oxides be contained in the lining or checkerwork of the furnace, as in the first place, the refractory materials will be greatly impaired, as is well-known; and in the second place, during the heating up period metals, such as copper, iron, etc., will be oxidized, as shown by the following familiar equations.

$$Cu+O=CuO$$
$$3Fe+4O=Fe_3O_4$$

Then, during the production of hydrogen and carbon these oxides will be reduced to reform the metal and carbon monoxid. This is a fact of elementary chemistry.

$$CuO+H_2=Cu+H_2O$$
$$CuO+C=Cu+CO$$

and also $$H_2O+C=H_2+CO$$

In case hydrogen reduces the copper oxid to form copper and water, the latter will in turn be reduced by the incandescent carbon in the furnace, so that the final result of the use of such is necessarily the addition of carbon monoxid as an impurity to the hydrogen.

The greater the amount of metals or metallic oxids present, the greater will be the proportion of carbon monoxid introduced.

The operation of making hydrogen and carbon black, utilizing the above described apparatus, is as follows, having reference to the apparatus of Fig. 1. With the valve 7 in stack 6 opened, and valve 15 to the carbon precipitating conduit 16 closed, gas (natural gas, coal gas, oil vapor or other hydrocarbon, preferably as a gas, liquid or volatilizable solid), is admitted through pipe 12 with a suitable amount of air by conduit 10 to chamber 9 below the checkerwork for the complete combustion of the fuel. The products of combustion pass upwardly through the interior of furnace 2 and its refractory contents 5, the operation being continued until the furnace and its contents are heated to a very high temperature, i. e., above the temperature at which the hydrocarbons to be used in the formation of hydrogen and carbon black are decomposed. When a suitable temperature has thus been reached, say 1400° C., or higher, the air supply and then the gas supply is shut off; the stack valve 7 is closed, valve 15 to the carbon precipitator is opened, and air valve 11 is closed. Then the valves in the pipe or pipes 8 at the top of the furnace are opened, and gas or other hydrocarbon is introduced at the top of the furnace. The hydrocarbon, passing downwardly in contact with the very highly heated refractory surfaces, and in the absence of air, is decomposed to form hydrogen and carbon black. These elements pass outwardly from the base of the furnace through conduit 14, entering the conveying conduit 16, being carried therethrough by conveyer 26 through the cooling water bath 17, effecting precipitation of the carbon, which is discharged by the conveyer into hopper 21. The hydrogen gas passing through the automatic pressure regulating valve 46, the water seal tank 32, and the washing tanks 34 and 37, and finally to the holder, is thus completely cleansed of any suspended impurities. The operation above described is continued until the temperature in the furnace 2 has been reduced to a degree below which entire decomposition of the hydrocarbon will not occur, whereupon the supply of hydrocarbon gas through pipe 8 is shut off at the top of the furnace, after pressure in the furnace is reduced to atmospheric pressure by relieving the regulating valve 46. Valve 15 to the precipitator conduit 16 is then closed, stack valve 7 is opened, and gas and air are again admitted from connections 12 and 10 for additional combustion and heating of the refractory contents of the furnace, preparatory to a repetition of the operation just described.

In case a liquid or volitilizable solid is used as a fuel at the base of the furnace, it may be sprayed or blown into the combustion chamber 9 with an air blast. When the same kind of hydrocarbon is used at the top of the furnace, instead of gas, for the making of hydrogen and carbon black, it may also be sprayed in under pressure, or atomized by aid of compressed hydrogen, without air, so that only minute particles of the carbon will strike the hot checkerwork, by using a suitable atomizer. Otherwise the entire checkerwork would soon be clogged with carbon, whereas, when either a gas or very fine spray is used, the finely divided carbon is carried down with the gas.

It will be readily understood that much of the carbon will necessarily adhere to the refractory material on the inner walls of the furnace, but by observing the above precautions this will be reduced to a minimum. Such adhering carbon will be consumed in the next heating operation of the furnace.

Owing to incidental traces of moisture in the hydrocarbon used and possible impurities such as metallic oxids in the refractory checkerwork, some carbon monoxid is ordinarily produced during the operation of the furnace.

Where the expression "absence of metals or metallic oxids" is used, it is understood to mean the absence of any supplemental or additional amounts of such, and that any such impurities as remain in the hydrogen are only such small amounts as the hydrocarbon may have added to it, or from the walls of the furnace, or from the refractory material contained in it.

When it is necessary to remove the carbon monoxid from the gas, the apparatus illustrated in Fig. 3 is employed and while the furnace shown in Fig. 1 is being heated up, air and gas is also admitted to furnace illustrated in Fig. 3. Then when the desired temperature has been obtained in furnace Fig. 1 the gas and air are shut off and gas is admitted at the top of the furnace, the stack valve is closed, and the hydrogen and carbon accumulate in the furnace and in the conveyer and screen box. The automatic valve 46$^b$ illustrated in Fig. 3 retains all the gases in these chambers until the desired pressure is obtained.

In case we are running the furnace under a pressure of fifteen pounds above atmospheric pressure a considerable amount of gas will be decomposed before any hydrogen will pass through the regulating valve 46 or 46$^b$.

It may be pointed out that the pressure may be regulated either at the valve 15 between the furnace, Fig. 1, and the conveyer, or by means of the automatic valve 46 or 46$^b$. When gas begins to pass through the automatic valve 46, steam is admitted into the furnace shown in Fig. 3 and the carbon monoxid in the gas is oxidized to carbon dioxid by means of the steam in contact with the refractory material or metallic oxids and passes over into the washing tanks where the carbon dioxid is removed by alkaline materials.

Where suitable natural gas is obtainable, such as Pennsylvania or West Virginia gas, this process is especially suited for making hydrogen, as each 1000 feet of natural gas will produce on decomposition over 2100 feet (cubic) of hydrogen. When one cubic foot of Pennsylvania or West Virginia natural gas burns in air, somewhat over 1100 B. T. U. (British thermal units) of heat are produced, while only 145 B. T. U. are required to break up the hydrocarbons in a cubic foot of the same gas to form hydrogen and carbon black. This value, 145 B. T. U. also includes the heat necessary to raise the temperature of the gas to the temperature at which it will be decomposed.

What we claim is:

1. The process of making carbon black consisting in decomposing a suitable hydrocarbon by bringing it into contact with highly heated refractory material within an inclosing chamber in the absence of air and at a pressure materially in excess of atmospheric pressure, and then separating the carbon from the hydrogen.

2. The process of making carbon black consisting in decomposing a suitable hydrocarbon by bringing it into contact with highly heated refractory material within an inclosing chamber in the absence of air and at a pressure materially in excess of atmospheric pressure, and then cooling the products to separate the carbon from the hydrogen.

3. The process of making carbon black consisting in decomposing a suitable hydrocarbon by bringing it into contact with highly heated refractory material within an inclosing chamber in the absence of air and at a pressure materially in excess of atmospheric pressure, then cooling the products to separate the carbon from the hydrogen, and then subjecting the hydrogen to cleansing operations to eliminate impurities.

4. The process of making carbon black and hydrogen consisting in heating refractory material within an inclosing chamber by combustion of a suitable fuel therein, and then passing a suitable hydrocarbon through the chamber at a pressure materially in excess of atmospheric pressure and in contact with the highly heated refractory material in the absence of air.

5. The process of making carbon black and hydrogen consisting in heating refractory material within an inclosing chamber by combustion of a suitable fuel therein, then passing a suitable hydrocarbon through the chamber at a pressure materially in excess of atmospheric pressure and in contact with the highly heated refractory material in the absence of air, and then cooling the products to separate the carbon from the hydrogen.

6. The process of making carbon black and hydrogen consisting in heating refractory material within an inclosing chamber by combustion of a suitable fuel therein, then passing a suitable hydrocarbon through the chamber at a pressure materially in excess of atmospheric pressure and in contact with the highly heated refractory material in the absence of air, then cooling the products to separate the carbon from the hydrogen, and then subjecting the hydrogen to suitable treatment for the elimination of impurities.

7. The process of making carbon black and hydrogen consisting in decomposing a suitable hydrocarbon by bringing it into contact with highly heated refractory material within an inclosing chamber in the absence of air and at a pressure materially in excess of atmospheric pressure, then separating the carbon from the hydrogen, then passing the resulting hydrogen and accompanying carbon monoxid through highly heated refractory material in the presence of steam, to oxidize the carbon monoxid and then separating the resulting carbon dioxid.

8. The process of making carbon black and hydrogen consisting in decomposing a suitable hydrocarbon by bringing it into contact with highly heated refractory material within an inclosing chamber in the absence of air and at a pressure materially in excess of atmospheric pressure, then separating the carbon from the hydrogen, then passing the resulting hydrogen and accompanying carbon monoxid through highly heated metallic oxids in the presence of steam to oxidize the carbon monoxid, and then separating the resulting carbon dioxid.

9. The process of making carbon black and hydrogen consisting in decomposing a suitable hydrocarbon by bringing it into contact with highly heated refractory material within an inclosing chamber in the absence of air and at a pressure materially in excess of atmospheric pressure, then separating the carbon from the hydrogen, then passing the resulting hydrogen and accompanying carbon monoxid through highly heated refractory material at a pressure materially in excess of atmospheric pressure in the presence of steam to oxidize the carbon monoxid, and then separating the resulting carbon dioxid.

10. The process of making carbon black and hydrogen consisting in decomposing a suitable hydrocarbon by bringing it into contact with highly heated refractory material within an inclosing chamber in the absence of air and at a pressure materially in excess of atmospheric pressure, then separating the carbon from the hydrogen, then passing the resulting hydrogen and accompanying carbon monoxid through highly heated metallic oxids at a pressure materially in excess of atmospheric pressure in the presence of steam to oxidize the carbon monoxid, and then separating the resulting carbon dioxid.

11. The process of making carbon black and hydrogen consisting in decomposing a suitable hydrocarbon by atomizing it in connection with a jet of hydrogen in contact with highly heated refractory material within an inclosing chamber in the absence of air and at a pressure materially in excess of atmospheric pressure, and then cooling the products to separate the carbon from the hydrogen.

12. The process of making carbon black consisting in decomposing a suitable hydrocarbon by bringing it into contact with highly heated refractory material within an inclosing chamber in the absence of air or metals or easily reducible metallic oxids and at a pressure materially in excess of atmospheric pressure, and then separating the carbon from the hydrogen.

In testimony whereof we hereunto affix our signatures in the presence of two witnesses.

ROY H. BROWNLEE.
ROY H. UHLINGER.

Witnesses:
EDWIN O. JOHNS,
W. A. HECKMAN.